United States Patent
Ikeda et al.

(10) Patent No.: US 8,987,991 B2
(45) Date of Patent: Mar. 24, 2015

(54) SUB HEADLIGHT UNIT AND SUB HEADLIGHT SYSTEM FOR USE IN VEHICLE THAT LEANS INTO TURNS, AND VEHICLE THAT LEANS INTO TURNS

(71) Applicant: Yamaha Hatsudoki Kabushiki Kaisha, Iwata-shi, Shizuoka (JP)

(72) Inventors: Takeshi Ikeda, Shizuoka (JP); Yasuhiko Kino, Shizuoka (JP); Takehiro Inoue, Shizuoka (JP); Makoto Kosugi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 130 days.

(21) Appl. No.: 13/772,618

(22) Filed: Feb. 21, 2013

(65) Prior Publication Data

US 2013/0241414 A1    Sep. 19, 2013

(30) Foreign Application Priority Data

Mar. 19, 2012 (JP) .................................. 2012-062379

(51) Int. Cl.
*B60Q 1/14* (2006.01)
*B60Q 1/18* (2006.01)
(Continued)

(52) U.S. Cl.
CPC .. *B60Q 1/18* (2013.01); *B60Q 1/12* (2013.01); *B60Q 1/28* (2013.01); *B60Q 1/46* (2013.01);
(Continued)

(58) Field of Classification Search
CPC .................................................... B60Q 1/0041

USPC ............................................................ 315/82
See application file for complete search history.

(56) References Cited

U.S. PATENT DOCUMENTS 2,516,052 A * 7/1950 Farr .............................. 362/529
7,439,849 B2 * 10/2008 Kameyama ................ 340/425.5
(Continued)

FOREIGN PATENT DOCUMENTS

| | | |
|---|---|---|
| EP | 1 645 466 A1 | 4/2006 |
| JP | 4806550 B2 | 11/2011 |
| WO | 2010/061651 A1 | 6/2010 |

OTHER PUBLICATIONS

Ooba et al., "Sub Headlight Unit and Sub Headlight System for Use in Vehicle That Leans Into Turns, and Vehicle That Leans Into Turns", U.S. Appl. No. 13/772,598, filed Feb. 21, 2013.
(Continued)

*Primary Examiner* — Douglas W Owens
*Assistant Examiner* — Srinivas Sathiraju
(74) *Attorney, Agent, or Firm* — Keating & Bennett, LLP

(57) ABSTRACT

A sub headlight unit for use in a vehicle that leans into turns includes a sub headlight light source that illuminates an area ahead and outward of the vehicle with respect to a width direction of the vehicle. The sub headlight light source is configured to, when the vehicle is in an upright state, produce an illumination range including an area above a horizontal plane. The sub headlight light source is turned on in accordance with a lean angle of the vehicle. At a time of parking or stopping or at a time of running straight ahead, the sub headlight light source is turned on or caused to flash with the amount of light per unit of time being reduced as compared with the amount of light per unit of time emitted when the sub headlight light source is turned on in accordance with the lean angle of the vehicle.

8 Claims, 5 Drawing Sheets

(51) Int. Cl.
*B60Q 1/12* (2006.01)
*B60Q 1/28* (2006.01)
*B60Q 1/46* (2006.01)
*B62J 6/02* (2006.01)

(52) U.S. Cl.
CPC ............. *B62J 6/02* (2013.01); *B60Q 2300/116* (2013.01); *B60Q 2300/136* (2013.01); *B62K 2207/02* (2013.01); *B60Q 2400/40* (2013.01)
USPC .................. 315/82; 315/83; 701/48; 362/545; 362/475; 362/509; 313/113; 313/114

(56) References Cited

U.S. PATENT DOCUMENTS

| | | | |
|---|---|---|---|
| 7,477,976 B2* | 1/2009 | Horii et al. | 701/49 |
| 7,860,627 B2* | 12/2010 | Horii et al. | 701/49 |
| 7,988,226 B2* | 8/2011 | Hirukawa | 296/198 |
| 7,988,345 B2* | 8/2011 | Rosenhahn et al. | 362/538 |
| 8,251,560 B2* | 8/2012 | Ohno et al. | 362/545 |
| 2004/0179366 A1* | 9/2004 | Takeda et al. | 362/464 |
| 2005/0270785 A1* | 12/2005 | Gropp et al. | 362/475 |
| 2008/0119994 A1* | 5/2008 | Kameyama | 701/48 |

OTHER PUBLICATIONS

Ooba et al., "Sub Headlight Unit and Sub Headlight System for Use in Vehicle That Leans Into Turns, and Vehicle That Leans Into Turns", U.S. Appl. No. 13/772,607, filed Feb. 21, 2013.

Official Communication issued in corresponding European Patent Application No. 13159839.3, mailed on Nov. 26, 2013.

* cited by examiner

SUB HEADLIGHT UNIT AND SUB HEADLIGHT SYSTEM FOR USE IN VEHICLE THAT LEANS INTO TURNS, AND VEHICLE THAT LEANS INTO TURNS

BACKGROUND OF THE INVENTION

1. Field of the Invention

The present invention relates to a sub headlight unit and a sub headlight system for use in a vehicle that leans into turns, and to a vehicle that leans into turns.

2. Description of the Related Art

In general, in a vehicle that leans into turns (such as saddle-ride type vehicles including motorcycles, three-wheeled motor vehicles, snowmobiles, and ATVs (all terrain vehicles), for example), when the vehicle corners or turns at an intersection, a rider operates a handlebar and additionally shifts his/her own weight in order to counteract centrifugal force acting on a vehicle body. As a result, the vehicle turns with an attitude (hereinafter, also referred to as "lean attitude") leaning to the inner side of a curve. On the other hand, in a vehicle that does not lean into turns, for example, in an automobile, when the vehicle corners or turns at an intersection, a rider operates a steering wheel and the vehicle turns with centrifugal force acting on a vehicle body thereof. Therefore, in the vehicle that does not lean into turns, the vehicle body leans to the outer side of a curve due to the centrifugal force.

In the vehicle that leans into turns, the turning is made with an active use of the weight shifting of the rider himself/herself. Therefore, the vehicle body largely leans. In the vehicle that does not lean into turns, the vehicle body leans to the outer side of the curve due to the centrifugal force. The degree of this leaning varies depending on the running speed of the vehicle and the magnitude (radius) of the curve, and this leaning of the vehicle body is not utilized for the turning. In the vehicle that does not lean into turns, it is preferable that the amount of leaning to the outer side of the curve due to the centrifugal force is small.

Thus, at a time of cornering or turning at an intersection, the vehicle that leans into turns causes the vehicle body to lean to the inner side of the curve with a relatively large amount of leaning, while the vehicle that does not lean into turns causes the vehicle body to lean to the outer side of the curve with a relatively small amount of leaning.

Normally, a vehicle is provided with a plurality of lights irrespective of whether or not the vehicle leans into turns. The lights include a light intended mainly to ensure a field of view of a rider of the vehicle and a light intended mainly to enable a surrounding vehicle or the like to recognize the presence of the rider's vehicle. A headlight is the light intended mainly to ensure the field of view of the rider of the vehicle, and in general, is configured to switch between a high beam (running headlight) and a low beam (passing headlight).

The high beam, which emits light in a horizontal (upward) direction, ensures a field of view at a long distance. Generally, in order to avoid blinding or impairing the vision of a rider of a nearby or oncoming vehicle, the high beam is used in a situation where there is no vehicle or the like existing ahead at night. The low beam, which emits light in a downward direction, is used even in a situation where there is a vehicle or the like existing ahead. Therefore, in a normal case, a vehicle often runs with the low beam turned on.

When the vehicle that leans into turns is running on a straight road, an illumination range of a headlight light source (low beam) spreads evenly to the left and right in an area ahead in an advancing direction and below a horizontal line of the headlight light source. When the vehicle that leans into turns is running on a road curving to the left, the vehicle runs with the vehicle body inclined to the left. Accordingly, the illumination range of the headlight light source spreads downward to the left. As a result, a nearer position on a running lane is illuminated. Thus, the illumination range in an area inside the curve and ahead in the advancing direction is reduced.

Therefore, a vehicle has been proposed in which, in addition to a main headlight that illuminates an area ahead of the vehicle, a pair of right and left sub headlights that are turned on depending on the magnitude of a lean angle (angle of inclination of a vehicle body to the inner side of a curve relative to an upright state thereof) are provided as the headlight (Japanese Patent No. 4806550). When the vehicle body is in the upright state, illumination ranges of the pair of right and left sub headlights are located above a cut-off line (which is a boundary line that defines the upper edge of the illumination range) of the main headlight, but the sub headlights are not turned on when the vehicle body is in the upright state. That is, in the vehicle disclosed in Japanese Patent No. 4806550, when the lean angle of the vehicle body increases and reaches a predetermined value, the sub headlights, which are arranged at the inner side of a curve, are turned on, while when the lean angle of the vehicle body decreases and falls below the predetermined value, the sub headlights are turned off.

In this manner, when the lean angle is large, the sub headlights shown in Japanese Patent No. 4806550 ensure a wide illumination range in an area inside a curve and ahead in the advancing direction, thus improving the visibility ahead in a path at a time of running along a curve. On the other hand, as described above, the sub headlights are directed upward, and have a relatively high brightness for improving the visibility ahead in a path. Therefore, when the lean angle is small, the sub headlights are turned off, to prevent blinding or impairing the vision of, for example, a rider of a nearby or oncoming vehicle.

Thus, the sub headlight shown in Japanese Patent No. 4806550 is a device useful for the vehicle that leans into turns, because the sub headlight has a function for adjusting a brightness level in accordance with the lean angle, to thereby ensure a wide illumination range in an inside area ahead in an advancing direction with suppression of glare.

Meanwhile, in the field of vehicles, from the viewpoint of the running performance and energy efficiency, it is generally desired that a vehicle body is a lightweight and its size is not more than required. Particularly, in the vehicle that leans into turns, downsizing of a vehicle body is quite strongly demanded for the reason that, for example, the attitude of a vehicle body is controlled by the weight shifting of a rider. Therefore, even the useful device as shown in Japanese Patent No. 4806550 is not easily allowed to be mounted on the vehicle body. Instead, it is desired that one device serves a plurality of functions.

SUMMARY OF THE INVENTION

Preferred embodiments of the present invention provide a sub headlight unit and a sub headlight system suitable for a vehicle that leans into turns and also provide a vehicle that leans into turns, in which characteristics of a sub headlight are leveraged to achieve different functions while preventing an increase in size.

According to a preferred embodiment of the present invention, a sub headlight unit for use in a vehicle that leans into turns includes a sub headlight light source that illuminates an area ahead and outward of the vehicle with respect to a width direction of the vehicle, wherein the sub headlight light source is configured to, when the vehicle is in an upright state, produce an illumination range including an area above a horizontal plane, and the sub headlight light source is turned on in accordance with a lean angle of the vehicle and, at a time of parking or stopping or at a time of running straight ahead, the sub headlight light source is turned on or caused to flash with the amount of light per unit of time being reduced as compared with the amount of light per unit of time emitted when the sub headlight light source is turned on in accordance with the lean angle of the vehicle.

The sub headlight light source preferably is a light intended mainly to ensure a field of view of a rider of the vehicle. Therefore, the sub headlight light source is installed such that it produces an illumination range including an area above the horizontal plane when the vehicle is in the upright state. Additionally, the brightness of the sub headlight light source is relatively high. Accordingly, for prevention of glare, in the conventional configuration, the sub headlight light source is turned on when the lean angle of the vehicle is large.

However, in a configuration of a preferred embodiment of the present invention, at a time of parking or stopping or at a time of running straight ahead, the sub headlight light source is turned on or caused to flash with the amount of light per unit of time being reduced. As a result, the sub headlight light source is used as a light intended to enable a surrounding vehicle or the like to recognize the presence of the vehicle including the sub headlight light source while preventing glare. For example, causing the sub headlight light source to flash when the vehicle is stopped can provide an answerback function. Turning on the sub headlight light source in a dimmed state when the vehicle is running straight ahead can achieve a function as a position light. Since the sub headlight light source is installed such that it produces an illumination range including an area above the horizontal plane when the vehicle is in the upright state, an excellent conspicuity is obtained when seen from the surroundings. Accordingly, the sub headlight light source is able to serve a plurality of functions, which can prevent a size increase of the device as a whole.

In a preferred embodiment of the present invention, the amount of light per unit of time emitted from the sub headlight light source at a time of parking or stopping or at a time of running straight ahead is smaller than the amount of light per unit of time emitted from the sub headlight light source when the sub headlight light source is turned on in accordance with the lean angle of the vehicle. The unit of time is not limited to one second, but can be set to any value. As for the magnitude relationship between these amounts of light, for example, in a case where the sub headlight light source is turned on in a full-light state in accordance with the lean angle of the vehicle while the sub headlight light source is turned on in a dimmed state at a time of parking or stopping or at a time of running straight ahead, the magnitude relationship between the amounts of light is obvious even without precise identification of the amounts of light. Also, in a case where the sub headlight light source is turned on in the full-light state in accordance with the lean angle of the vehicle while the sub headlight light source is caused to flash with full light at a time of parking or stopping or at a time of running straight ahead, the magnitude relationship between the amounts of light is obvious even without precise identification of the amounts of light. When, in this manner, the magnitude relationship between the amounts of light can be identified from a manner of turn-on of the sub headlight light source, it is not always necessary to actually measure the amount of light.

As described above, the unit of time can be set to any value. However, for example, in a case where one of the amounts of light is the amount of light per unit of time emitted when the sub headlight light source flashes, the unit of time is set equal to or longer than a period of the flashing, to facilitate the comparison between the amounts of light.

An illumination range of the sub headlight light source produced when the sub headlight light source is turned on or caused to flash with the amount of light per unit of time being reduced preferably is located higher than an illumination range of the sub headlight light source produced when the sub headlight light source is turned on in accordance with the lean angle of the vehicle.

This configuration can improve the conspicuity in a case where the sub headlight light source is used as a light (for example, an answerback or position light) intended to enable a nearby or oncoming vehicle or the like to recognize the presence of the vehicle including the sub headlight light source.

An optical axis of the sub headlight light source occurring when the sub headlight light source is turned on or caused to flash with the amount of light per unit of time being reduced preferably is directed upward relative to an optical axis of the sub headlight light source occurring when the sub headlight light source is turned on in accordance with the lean angle of the vehicle.

This configuration can improve the conspicuity in a case where the sub headlight light source is used as a light intended to enable a nearby or oncoming vehicle or the like to recognize the presence of the vehicle including the sub headlight light source.

The sub headlight light source preferably is turned on or caused to flash with the amount of light per unit of time being reduced, under a state where an optical axis of the sub headlight light source is directed at or above a horizontal plane.

This configuration can improve the conspicuity in a case where the sub headlight light source is used as a light intended to enable a nearby or oncoming vehicle or the like to recognize the presence of the vehicle including the sub headlight light source.

When the sub headlight light source is turned on in accordance with the lean angle of the vehicle, a cut-off line of the sub headlight light source preferably is located at or below a horizontal line of the sub headlight light source, while when the sub headlight light source is turned on or caused to flash with the amount of light per unit of time being reduced, the cut-off line of the sub headlight light source preferably is wholly or partially located in an area above the horizontal line of the sub headlight light source.

This configuration can improve the conspicuity in a case where the sub headlight light source is used as a light intended to enable a nearby or oncoming vehicle or the like to recognize the presence of the vehicle including the sub headlight light source.

According to another preferred embodiment of the present invention, a sub headlight system for use in a vehicle that leans into turns includes a sub headlight unit according to one of the preferred embodiments described above; a control unit arranged and programmed to control light emission of the sub headlight light source; and a detection unit arranged to detect a variable used for obtaining the lean angle of the vehicle, wherein the control unit turns on the sub headlight light source in accordance with the lean angle of the vehicle and, at a time of parking or stopping or at a time of running straight ahead, the control unit causes the sub headlight light source to be turned on or flash with the amount of light per unit of time being reduced as compared with the amount of light per unit of time emitted when the sub headlight light source is turned on in accordance with the lean angle of the vehicle.

In this configuration, the sub headlight light source is turned on in accordance with the lean angle and thus functions as a light intended mainly to ensure a field of view of a rider of the vehicle, while, at a time of parking or stopping or at a time of running straight ahead, the sub headlight light source is turned on or caused to flash with the amount of light per unit of time being reduced and thus functions as a light intended to enable a surrounding vehicle or the like to recognize the presence of the vehicle including the sub headlight light source. Since the sub headlight light source is installed such that it produces an illumination range including an area above the horizontal plane when the vehicle is in the upright state, an excellent conspicuity is obtained when seen from the surroundings. Accordingly, the sub headlight light source is able to serve a plurality of functions. As a result, an AFS (Adaptive Front-Lighting System) that can prevent a size increase of the device as a whole is achieved.

The sub headlight system preferably includes a communication unit that communicates with a portable communication device that is portable for a rider, wherein the control unit turns on the sub headlight light source in accordance with the lean angle of the vehicle and, in a case where communication between the communication unit and the portable communication device satisfies a predetermined condition at a time of parking or stopping, the control unit causes the sub headlight light source to be turned on or flash with the amount of light per unit of time being reduced as compared with the amount of light per unit of time emitted when the sub headlight light source is turned on in accordance with the lean angle of the vehicle.

In this configuration, the sub headlight light source has a function of answerback. Since the amount of light per unit of time is reduced, dazzling of surroundings can be prevented. Moreover, since the illumination range includes an area above the horizontal plane, an excellent conspicuity is obtained when seen from the surroundings. Accordingly, the sub headlight light source is turned on in accordance with the lean angle, and on the other hand, exerts an excellent answerback function at a time of parking or stopping.

The control unit preferably turns on the sub headlight light source in accordance with the lean angle of the vehicle and, at a time of running straight ahead, the control unit turns on the sub headlight light source with the amount of light per unit of time being reduced.

In this configuration, the sub headlight light source has a function as a position light. Since the amount of light per unit of time is reduced, dazzling of surroundings can be prevented. Moreover, since the illumination range includes an area above the horizontal plane, an excellent conspicuity is obtained when seen from the surroundings. Accordingly, the sub headlight light source is turned on in accordance with the lean angle, and on the other hand, exerts an excellent function as a position light at a time of running straight ahead.

According to yet another preferred embodiment of the present invention, a vehicle that leans into turns includes the sub headlight system according to any one of the preferred embodiments described above.

In this configuration, the sub headlight light source is turned on in accordance with the lean angle and thus functions as a light intended mainly to ensure a field of view of a rider of the vehicle, while, at a time of parking or stopping or at a time of running straight ahead, the sub headlight light source is turned on or caused to flash with the amount of light per unit of time being reduced and thus functions as a light intended to enable a surrounding vehicle or the like to recognize the presence of the vehicle including the sub headlight light source. Since the sub headlight light source is installed such that it produces an illumination range including an area above the horizontal plane when the vehicle is in the upright state, an excellent conspicuity is obtained when seen from the surroundings. Accordingly, the sub headlight light source is able to serve a plurality of functions, which can prevent a size increase of the device as a whole.

In preferred embodiments of the present invention, the optical axis is a straight line that passes through a light source and the center of a maximum illuminance portion of emitted light. The center of the maximum illuminance portion of the emitted light can be identified by emitting light from a light source to a screen that is placed ahead of the light source. This screen illuminance test can be implemented by a method specified in JIS D1619. Also, the cut-off line and the illumination range having the predetermined illuminance can be identified based on a result (such as an isolux distribution map) of the screen illuminance test mentioned above. The cut-off line and the illumination range having the predetermined illuminance in a plan view can be identified based on a road-surface light distribution that is obtained by converting the result of the screen illuminance test mentioned above into the road-surface light distribution. The conversion into the road-surface light distribution can be implemented by a conventionally known method. To be specific, through commonly-used drawing and geometric calculation, conversion from a screen illuminance value into a road-surface illuminance value can be performed. In such a case, the following expression (I) is usable. In the following expression (I), D represents a light source, E represents a point on a road surface, and F represents a point of intersection at which the screen placed between D and E intersects with a straight line connecting D to E.

$$\text{Road-surface illuminance}(Lx) = \text{Screen Illuminance}(Lx) \times [(\text{Distance between } D \text{ and } F(m))/(\text{Distance between } D \text{ and } E(m))]^2 \quad (I)$$

In preferred embodiments of the present invention, characteristics of a sub headlight light source are leveraged, and thus different functions are achieved in the sub headlight light source while preventing a size increase.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
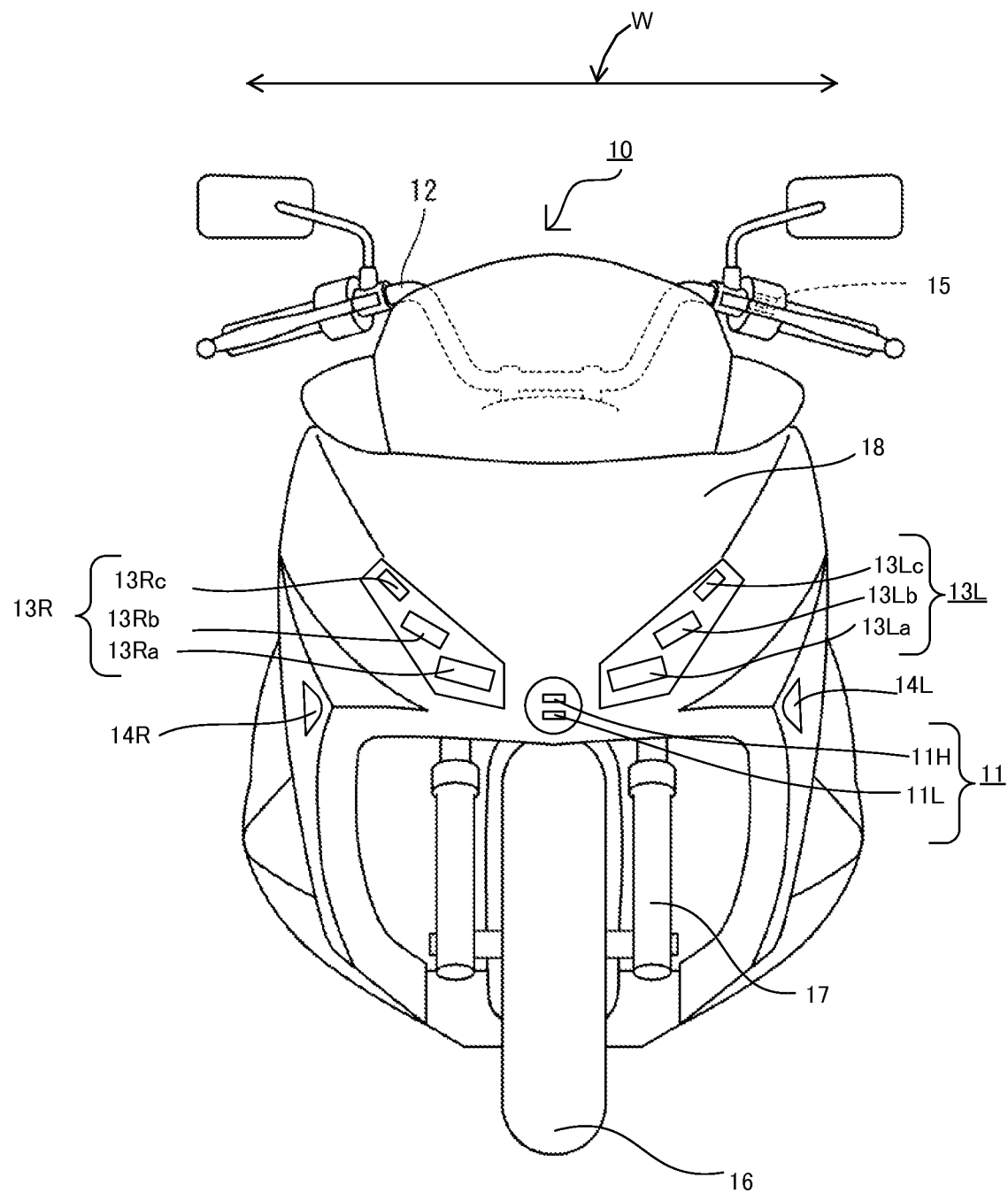
FIG. 1 is a front elevational view schematically showing a motorcycle according to a preferred embodiment of the present invention.

FIG. 1 is a front elevational view schematically showing a motorcycle 10 according to a preferred embodiment of the present invention.

The motorcycle 10 is a non-limiting example of a vehicle that leans into turns according to a preferred embodiment of the present invention. In the present invention, no particular limitation is put on the vehicle that leans into turns. For example, saddle-ride type vehicles including motorcycles, three-wheeled motor vehicles, snowmobiles, and ATVs (all terrain vehicles) may be provided as a preferred embodiment of the present invention. In the following description, the terms "front" and "back" are terms with respect to an advancing direction of the vehicle, the terms "up" and "down" are terms with respect to the vertical direction of the vehicle, and the terms "right" and "left" are terms with respect to a rider.

The motorcycle 10 includes a handlebar 12. An operation switch 15 is provided in a left portion of the handlebar 12 with respect to a width direction W of the vehicle. The operation switch 15 includes a beam switch 15B and a flasher switch 15F (see FIG. 2). A steering shaft (not shown) is fixed to a center portion of the handlebar 12 with respect to the width direction of the vehicle. The steering shaft extends Downward through a headpipe (not shown). A frontfork 17 is provided at a lower end of the steering shaft. A front wheel 16 is rotatably supported at the lower end of the frontfork 17. The headpipe is a member constituting a vehicle body frame. In the present invention, no particular limitation is put on the vehicle body frame, and a conventionally known configuration is adoptable.

A front cover 18 covers a front portion of the headpipe having the steering shaft passing therethrough. On a front surface of the front cover 18, a main headlight 11 is provided in a center portion with respect to the width direction of the vehicle. The main headlight 11 includes a high beam light source 11H (running headlight) and a low beam light source 11L (passing headlight). The high beam light source 11H illuminates an area ahead of the motorcycle 10 at a height equal to or above a horizontal plane of the main headlight 11. The low beam light source 11L illuminates an area ahead of the motorcycle 10 at a height below the horizontal plane of the main headlight 11.

The high beam light source 11H and the low beam light source 11L are configured such that only one of them is turned on at one time, for example. The rider operates the beam switch 15B (see FIG. 2), to switch turn-on of the high beam light source 11H and turn-on of the low beam light source 11L.

The motorcycle 10 includes a sub headlight 13. The sub headlight 13 preferably includes two sub headlight units 13L and 13R of variable light distribution type. Each of the sub headlight units 13L and 13R is provided at each side with respect to the width direction of the vehicle. The sub headlight unit 13L includes a plurality of sub headlight light sources 13La, 13Lb, and 13Lc. The sub headlight light sources 13La, 13Lb, and 13Lc are arranged in this order from the center toward the upper left with respect to the width direction of the vehicle. Illumination ranges of the sub headlight light sources 13La, 13Lb, and 13Lc are arranged in this order from the center toward the upper left with respect to the width direction of the vehicle. The illumination ranges of the sub headlight light sources 13La, 13Lb, and 13Lc overlap one another (see FIGS. 3 and 4). The sub headlight unit 13R includes a plurality of sub headlight light sources 13Ra, 13Rb, and 13Rc. The sub headlight light sources 13Ra, 13Rb, and 13Rc are arranged in this order from the center toward the upper right with respect to the width direction of the vehicle. Illumination ranges of the sub headlight light sources 13Ra, 13Rb, and 13Rc are arranged in this order from the center toward the upper right with respect to the width direction of the vehicle. The illumination ranges of the sub headlight light sources 13Ra, 13Rb, and 13Rc overlap one another (see FIGS. 3 and 4). Optical axes of the sub headlight light sources 13La to 13Lc, 13Ra to 13Rc are fixed, and not moved in accordance with the lean angle. A reflector (not shown) of the sub headlight light source is also fixed, and not moved in accordance with the lean angle. In this preferred embodiment, no particular limitation is put on the sub headlight light source. For example, an LED is adoptable. A mono-focus type light source is also adoptable as the sub headlight light source. As for how the sub headlight light sources 13La to 13Lc, 13Ra to 13Rc are arranged in the motorcycle 10, the above-described arrangement manner is merely an illustrative example of the present invention. The present invention is not limited to this example.

Flashers 14L and 14R, serving as direction indicators, are provided at both sides of the motorcycle 10 with respect to the width direction of the vehicle. The flashers 14L and 14R are configured such that only one of them flashes at one time. The rider operates the flasher switch 15F (see FIG. 2), and thus flashing/turn-off of the flashers 14L and 14R is switched.

The plurality of sub headlight light sources 13La, 13Lb, and 13Lc, which are positioned at the left side in the motorcycle with respect to the width direction of the vehicle, are arranged between the main headlight 11 and the flasher 14L. The plurality of sub headlight light sources 13Ra, 13Rb, and 13Rc, which are positioned at the right side in the motorcycle 10, are arranged between the main headlight 11 and the flasher 14R. In the present invention, no particular limitation is put on the positional relationship between the sub headlight light source and the flasher. For example, it may be acceptable that the sub headlight light source is provided outside the flasher with respect to the width direction of the vehicle.

The plurality of sub headlight light sources 13La, 13Lb, and 13Lc are provided above the main headlight 11 and the flasher 14L. The plurality of sub headlight light sources 13Ra, 13Rb, and 13Rc are provided above the main headlight 11 and the flasher 14R.

The plurality of sub headlight light sources 13La to 13Lc, which are provided to the left with respect to the width direction of the vehicle, illuminate an area ahead of and left-lateral to the motorcycle 10. The plurality of sub headlight light sources 13Ra to 13Rc, which are provided to the right with respect to the width direction of the vehicle, illuminate an area ahead of and right-lateral to the motorcycle 10.

Figure 2:
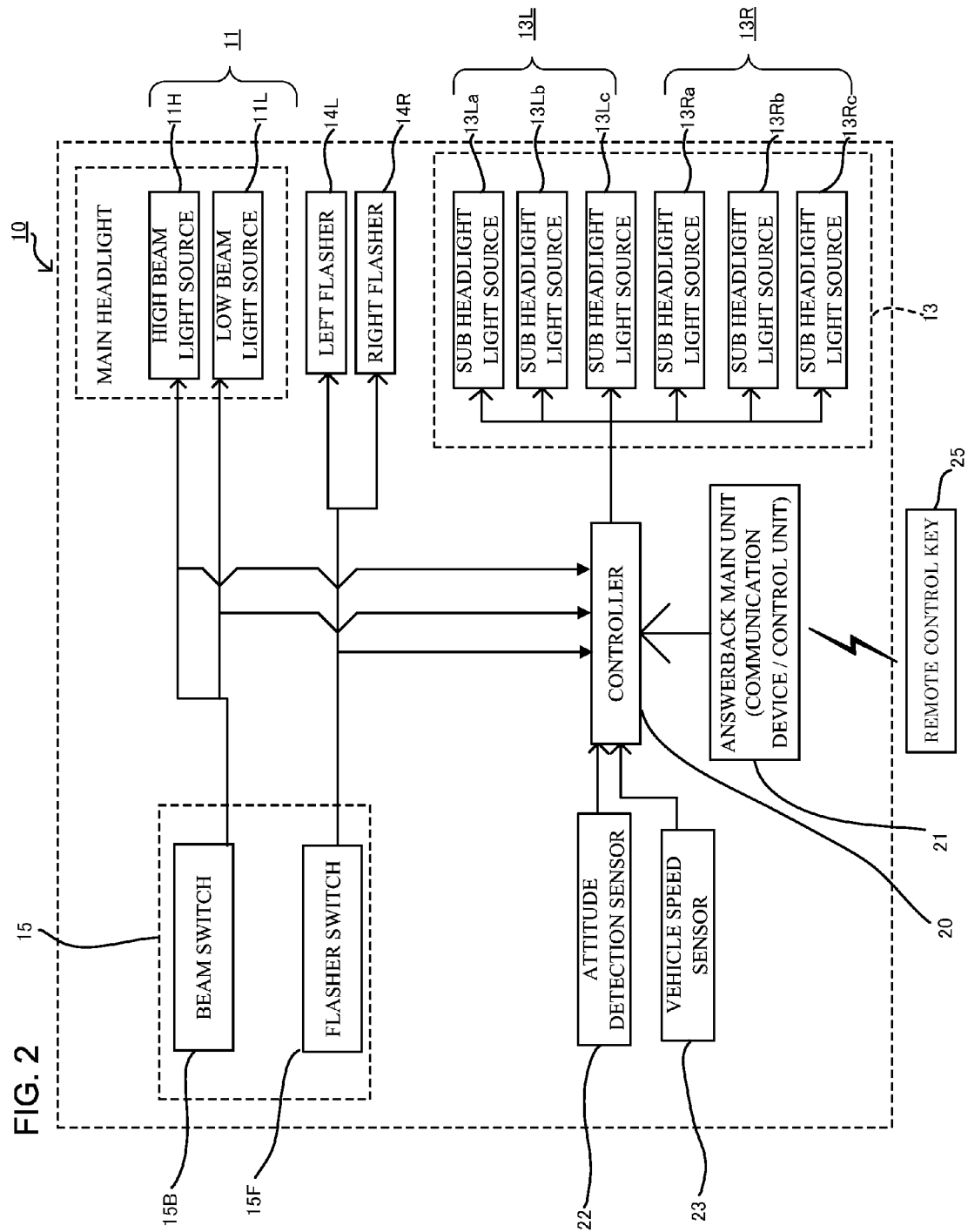
FIG. 2 is a block diagram showing a basic configuration concerning sub headlight light sources of the motorcycle shown in FIG. 1.

FIG. 2 is a block diagram showing a basic configuration concerning the sub headlight light sources 13La to 13Lc, 13Ra to 13Rc of the motorcycle 10 shown in FIG. 1.

The operation switch 15 includes the beam switch 15B and the flasher switch 15F. The beam switch 15B is connected to the high beam light source 11H and the low beam light source 11L included in the main headlight 11. When the rider operates the beam switch 15B, turn-on/turn-off of the high beam light source 11H and the low beam light source 11L is switched in accordance with the operation performed on the beam switch 15B.

The flasher switch 15F is connected to the flashers 14L and 14R. When the rider operates the flasher switch 15F, one of the flashers 14L and 14R is caused to flash in accordance with the operation performed on the flasher switch 15F.

In the motorcycle 10, an attitude detection sensor 22 and a vehicle speed sensor 23 are preferably provided. In this preferred embodiment, the attitude detection sensor 22 preferably is a gyro sensor that detects the angular velocity about an axis in the front-back direction of the motorcycle 10. The attitude detection sensor 22 supplies, to a controller 20, a signal indicating the detected angular velocity (roll rate) about the axis in the front-back direction. The vehicle speed sensor 23 detects the vehicle speed, and supplies, to the controller 20, a signal indicating the detected vehicle speed. Each time a predetermined timing comes during running, the controller 20 calculates the lean angle of the motorcycle 10 based on the angular velocity about the axis in the front-back direction and the vehicle speed.

In this preferred embodiment, the roll rate is integrated over time, and the vehicle speed is used as correction information so as to calculate the lean angle. However, in the present invention, a method for calculating the lean angle is not limited to this example. In the calculation of the lean angle, the vehicle speed is not an essential variable. For calculating the lean angle, a conventionally known method is adoptable. For example, the calculation may be performed based on a static equilibrium equation by using the yaw rate (angular velocity about an axis in the vertical direction) and the vehicle speed. The correction information is not limited to the vehicle speed. For example, it may be acceptable to provide a plurality of gyro sensors and G sensors and use values obtained from these sensors and the vehicle speed as the correction information. Instead of the vehicle speed, GPS position information and/or geomagnetic information may be used as the correction information. No particular limitation is put on sensors (detectors) that detect variables that are available for obtaining the lean angle. An appropriate sensor may be provided in accordance with variables available for the calculation.

The controller 20 preferably includes a memory (not shown). The memory stores, in the form of data, a plurality of reference values to be compared with the lean angle. In this preferred embodiment, the memory stores three reference values (a first reference value, a second reference value, and a third reference value). The first reference value, the second reference value, and the third reference value satisfy the relationship of first reference value<second reference value<third reference value.

The first reference value is associated with the sub headlight light sources 13La and 13Ra.

The second reference value is associated with the sub headlight light sources 13Lb and 13Rb.

The third reference value is associated with the sub headlight light sources 13Lc and 13Rc.

In the motorcycle 10, at a time of parking (when an engine is stopped), the sub headlight light sources 13La to 13Lc, 13Ra to 13Rc are turned off, and at a time of stopping and at a time of running straight ahead, all or a portion of the sub headlight light sources 13La to 13Lc, 13Ra to 13Rc are turned on in a dimmed state. The number and the positions of the sub headlight light sources to be turned on are not particularly limited.

No particular limitation is put on a method for dimming the sub headlight light source. For example, it may be conceivable to reduce a current to be supplied to the sub headlight light source, or to reduce a voltage to be supplied to the sub headlight light source. For adjusting light of a sub headlight light source such as an LED by performing a pulse width modulation control (PWM control), reducing the duty cycle can dim the sub headlight light source.

Alternatively, a single sub headlight light source may include a plurality of light sources having different brightnesses. In this case, the dimming of the sub headlight light source can be implemented by switching turn on among the light sources. For example, in a case where a single sub headlight light source includes two light sources having different brightnesses, switching the turn-on light source from the light source having a higher brightness to the light source having a lower brightness enables the sub headlight light source to light up in a dimmed state.

Furthermore, a single sub headlight light source may include a plurality of light sources. In this case, the dimming of the sub headlight light source can be implemented by changing the number or combination of light sources that are turned on. The brightnesses of the plurality of light sources may be either different or the same. For example, in a case where a single sub headlight light source includes a plurality of light sources (for example, four light sources) having the same brightness, turning on all the plurality of light sources enables the sub headlight light source to light up in a full-light state while turning on a portion of the plurality of light sources enables the sub headlight light source to light up in a dimmed state.

In the course of a gradual increase in the lean angle along with inclination of the motorcycle 10 to the left, when the lean angle reaches the first reference value, the sub headlight light source 13La is turned on in the full-light state, and when the lean angle reaches the second reference value, the sub headlight light source 13Lb is turned on in the full-light state, and when the lean angle reaches the third reference value, the sub headlight light source 13Lc is turned on in the full-light state. Thus, along with an increase in the lean angle, the sub headlight light sources 13La, 13Lb, and 13Lc sequentially change from the dimmed state into the full-light state. On the other hand, when the lean angle decreases, the sub headlight light sources 13Lc, 13Lb, and 13La sequentially change from the full-light state into the dimmed state. The same applies to a case where the motorcycle 10 is inclined to the right.

It may be also acceptable that, while the sub headlight light sources 13La, 13Lb, and 13Lc sequentially change from the dimmed state into the full-light state along with an increase in the lean angle, the sub headlight light sources 13Rc, 13Rb, and 13Ra sequentially change from the dimmed state into a turn-off state.

To be specific, it may be acceptable that, when the vehicle is inclined to one side (for example, to the left) with respect to the width direction of the vehicle so that the lean angle increases, the plurality of sub headlight light sources (13La to 13Lc) that illuminate this one side increase their brightnesses sequentially in ascending order from the sub headlight light source (13La) having an illumination range whose upper end edge is located lower to the sub headlight light source (13Lc) having an illumination range whose upper end edge is located higher, while the plurality of sub headlight light sources (13Rc to 13Ra) that illuminate the other side (right side) of the vehicle with respect to the width direction of the vehicle decrease their brightnesses sequentially in descending order from the sub headlight light source (13Rc) having an illumination range whose upper end edge is located higher than the sub headlight light source (13Ra) having an illumination range whose upper end edge is located lower.

An answerback main unit 21 is connected to the controller 20. The answerback main unit 21 receives a signal radio wave from a remote control key 25 serving as a transmitter. The remote control key 25 is portable for the rider. When communication with the remote control key 25 satisfies a predetermined condition, the answerback main unit 21 transmits to the controller 20 a request signal to change the brightnesses of the sub headlight light sources 13La to 13Lc, 13Ra to 13Rc. The predetermined condition is not particularly limited, and examples thereof include that the answerback main unit 21 receives a signal from the remote control key 25 when the vehicle is parked (when the engine is stopped) and that an answer signal in response to an inquiry signal of the answerback main unit 21 is not received from the remote control key 25 when the vehicle is stopped (when the engine is running).

The controller 20 receives the request signal from the answerback main unit 21. Then, the controller 20 performs a control to change the brightnesses of the sub headlight light sources 13La to 13Lc, 13Ra to 13Rc, and performs an answerback operation. In this preferred embodiment, in the answerback operation, the sub headlight light sources 13La to 13Lc, 13Ra to 13Rc are turned on in a predetermined pattern. The answerback operation will be described in detail with reference to FIG. 5.

In this preferred embodiment, the beam switch 15B and the flasher switch 15F are connected to the controller 20, and signals supplied from the beam switch 15B and the flasher switch 15F are inputted to the controller 20.

In various preferred embodiments of the present invention, the controller 20 is programmed and allowed to control the sub headlight light sources 13La to 13Lc, 13Ra to 13Rc by using the signals supplied from the beam switch 15B and the flasher switch 15F.

In such a case, no particular limitation is put on a manner of using the signals supplied from the beam switch 15B and the flasher switch 15F.

For example, it may be conceivable that, when a signal for turning on the high beam light source 11H is received from the beam switch 15B, the controller 20 does not control the sub headlight light sources 13La to 13Lc, 13Ra to 13Rc in accordance with the lean angle. In this case, when the high beam light source 11H is turned on, the controller 20 may turn off the sub headlight light sources 13La to 13Lc, 13Ra to 13Rc, or may turn on any of the sub headlight light sources 13La to 13Lc, 13Ra to 13Rc.

It may be also possible that the controller 20 does not control the sub headlight light sources 13La to 13Lc, 13Ra to 13Rc in accordance with the lean angle during a time period from when a signal that causes any one of the flashers 14L and 14R to flash is received from the flasher switch 15F to when a signal for turning off the flashers 14L and 14R is received from the flasher switch 15F. In such a case, when the flasher 14L or 14L is flashing, all of the sub headlight light sources (for example, the sub headlight light sources 13La to 13Lc) capable of illuminating the side where the flasher (for example, the flasher 14L) that is currently flashing is arranged may be turned on in the full-light state.

Figure 3:
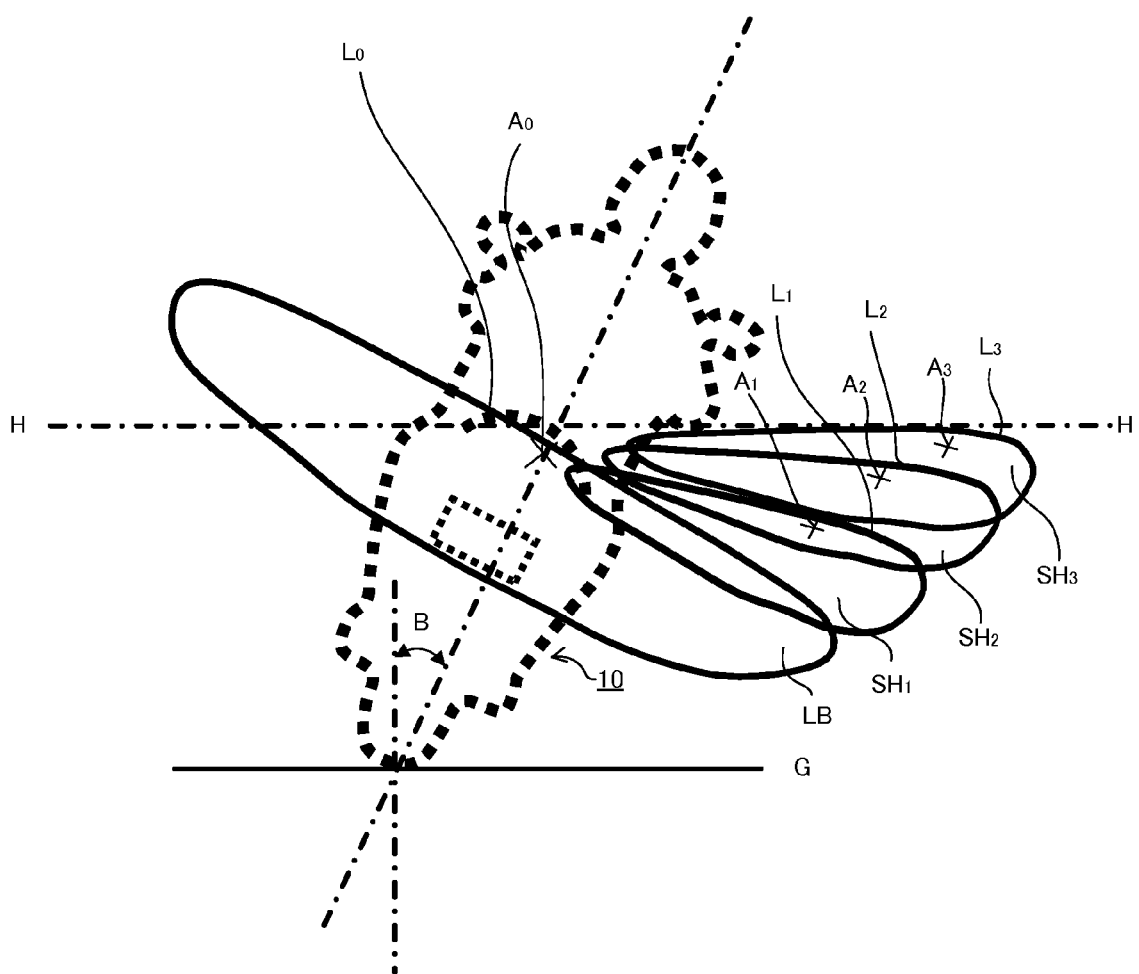
FIG. 3 is a diagram schematically showing a screen light distribution of the motorcycle of FIG. 1 when the motorcycle is in an inclined state.

FIG. 3 is a diagram schematically showing, in a front elevational view, a screen light distribution of the motorcycle 10 of FIG. 1 when the motorcycle 10 is in an inclined state.

The motorcycle 10 is inclined to the left at a lean angle B relative to a ground G. The lean angle B corresponds to the third reference value. An illumination range LB of the low beam light source 11L is inclined downward to the left. A cut-off line $L_0$ of the low beam light source 11L, which defines an upper boundary line of the illumination range LB, is inclined downward to the left similarly to the illumination range LB. Accordingly, in a case where only the low beam light source 11L illuminates ahead, an illumination range produced in an inner left area ahead in the advancing direction is reduced. An optical axis $A_0$ of the low beam light source 11L is located below a horizontal line H of the low beam light source 11L.

In the motorcycle 10, however, the lean angle B has reached the third reference value and therefore the sub headlight light sources 13La to 13Lc are turned on in the full-light state, so that illumination ranges $SH_1$ to $SH_3$ of the sub headlight light sources 13La to 13Lc cover an area between the horizontal line H and the cut-off line $L_0$ of the low beam light source 11L. As a result, a wide illumination range is ensured in the inner left area ahead in a path. This improves the visibility ahead in the path at a time of running along a curve. Additionally, since cut-off lines $L_1$ to $L_3$ of the illumination ranges $SH_1$ to $SH_3$ and optical axes $A_1$ to $A_3$ are located below the horizontal line H, occurrence of glare is prevented.

Figure 4:
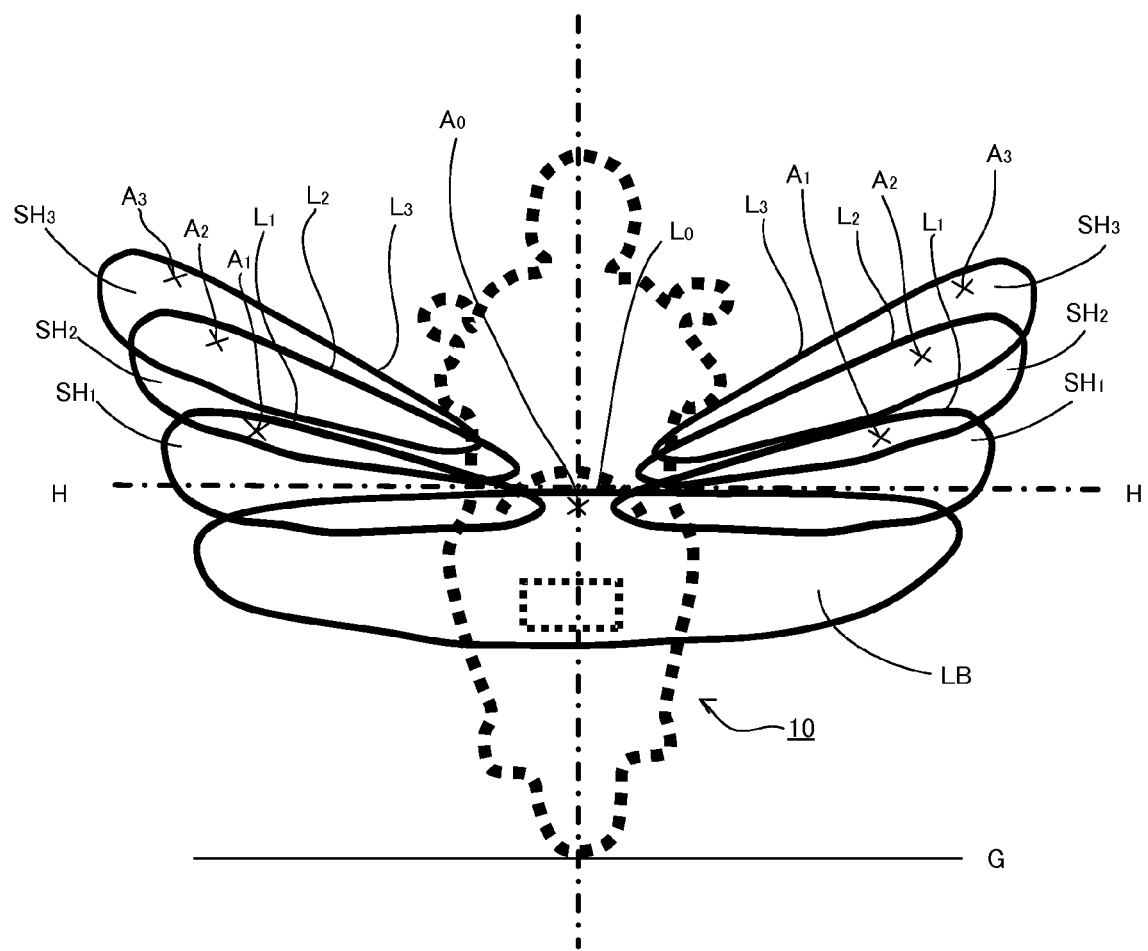
FIG. 4 is a diagram schematically showing a screen light distribution of the motorcycle of FIG. 1 when the motorcycle is in an upright state.

FIG. 4 is a diagram schematically showing a screen light distribution of the motorcycle 10 of FIG. 1 when the motorcycle 10 is in an upright state.

FIG. 4 shows a state where the sub headlight light sources 13La to 13Lc, 13Ra to 13Rc are turned on in the dimmed state at a time of running straight ahead. The cut-off line $L_0$ of the illumination range LB and the optical axis $A_0$ of the low beam light source 11L are located below the horizontal line H. The illumination ranges $SH_1$ to $SH_3$ of the sub headlight light sources 13La to 13Lc, 13Ra to 13Rc include an area above the horizontal line H. The sub headlight light sources 13La to 13Lc, 13Ra to 13Rc are turned on in the dimmed state under a state where the optical axes $A_1$ to $A_3$ are directed above a horizontal plane.

In the motorcycle 10, the illumination ranges $SH_1$ to $SH_3$ produced when the sub headlight light sources 13La to 13Lc are turned on in the dimmed state (FIG. 4) are located higher than the illumination ranges $SH_1$ to $SH_3$ produced when the sub headlight light sources 13La to 13Lc are turned on in accordance with the lean angle B of the motorcycle 10 (FIG. 3). Similarly, the optical axes $A_1$ to $A_3$ occurring when the sub headlight light sources 13La to 13Lc are turned on in the dimmed state (FIG. 4) are directed upward relative to the optical axes $A_1$ to $A_3$ occurring when the sub headlight light sources 13La to 13Lc are turned on in accordance with the lean angle B of the motorcycle (FIG. 3). Accordingly, the conspicuity of the sub headlight light sources 13La to 13Lc is ensured at a time of performing the answerback operation. Additionally, the conspicuity thereof as a position light is improved.

Figure 5A:
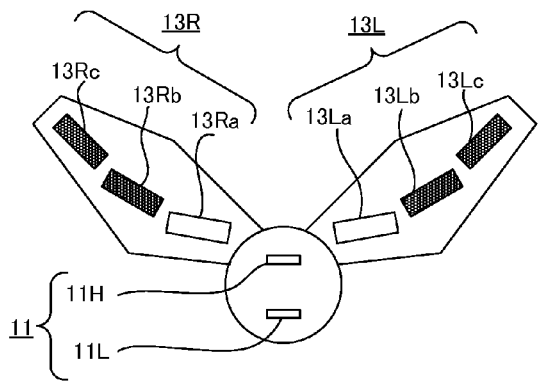
FIGS. 5A-5C are diagrams showing an example of a lighting pattern of the sub headlight light sources of the motorcycle of FIG. 1, and FIGS. 5D-5F are diagrams showing another example of the lighting pattern.
Figure 5D:
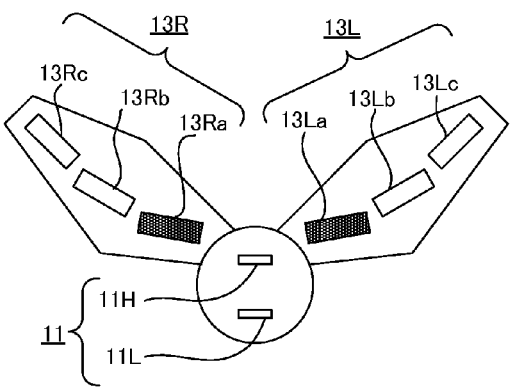
Figure 5B:
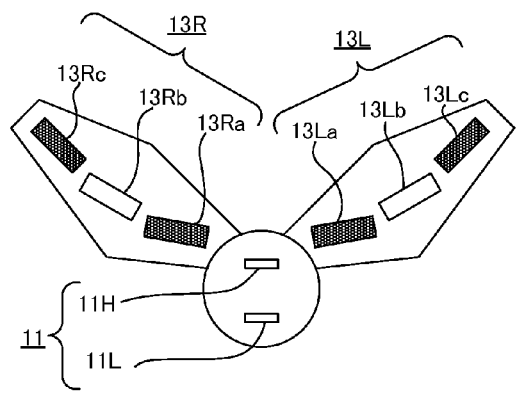
Figure 5E:
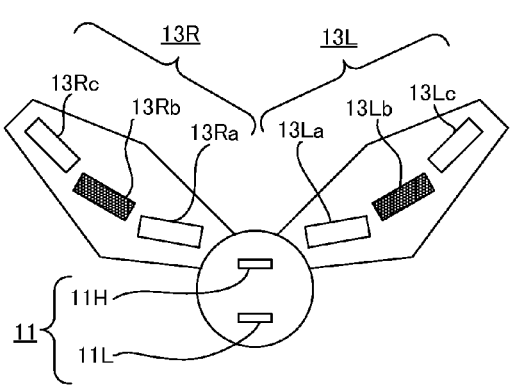
Figure 5C:
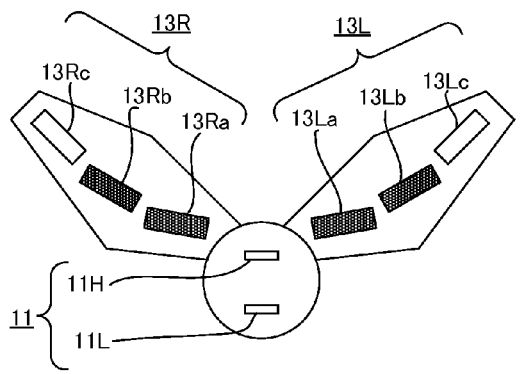

FIGS. 5A to 5C are diagrams showing an example of a lighting pattern of the sub headlight light sources 13La to 13Lc, 13Ra to 13Rc of the motorcycle 10 of FIG. 1, and FIGS. 5D to 5F are diagrams showing another example of the lighting pattern. In FIGS. 5A-5F, hatching is given to the sub headlight light sources that are currently turned on.

In a case where communication between the answerback main unit 21 and the remote control key 25 satisfies the predetermined condition, the controller 20 controls the sub headlight light sources 13La to 13Lc, 13Ra to 13Rc.

For example, firstly, as shown in FIG. 5A, the sub headlight light sources 13La and 13Ra are turned off while the sub headlight light sources 13Lb, 13Lc, 13Rb, and 13Rc are turned on in the full-light state for a predetermined time period.

Then, as shown in FIG. 5B, the sub headlight light sources 13Lb and 13Rb are turned off while the sub headlight light sources 13La, 13Lc, 13Ra, and 13Rc are turned on in the full-light state for a predetermined time period.

Then, as shown in FIG. 5C, the sub headlight light sources 13Lc and 13Rc are turned off while the sub headlight light sources 13La, 13Lb, 13Ra, and 13Rb are turned on in the full-light state for a predetermined time period.

Then, the lighting in the manner shown in FIGS. 5A to 5C is sequentially repeated a plurality of times. As a result, the sub headlight light sources 13La to 13Lc, 13Ra to 13Rc are caused to flash.

Alternatively, the sub headlight light sources 13La to 13Lc, 13Ra to 13Rc may be controlled as follows.

For example, firstly, as shown in FIG. 5D, the sub headlight light sources 13Lb, 13Lc, 13Rb, and 13Rc are turned off while the sub headlight light sources 13La and 13Ra are turned on in the full-light state for a predetermined time period.

Then, as shown in FIG. 5E, the sub headlight light sources 13La, 13Lc, 13Ra, and 13Rc are turned off while the sub headlight light sources 13Lb and 13Rb are turned on in the full-light state for a predetermined time period.

Figure 5F:
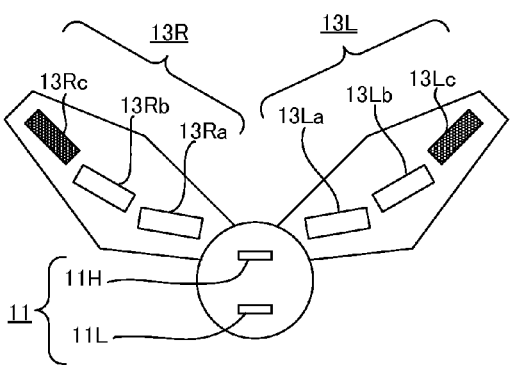

Then, as shown in FIG. 5F, the sub headlight light sources 13La, 13Lb, 13Ra, and 13Rb are turned off while the sub headlight light sources 13Lc and 13Rc are turned on in the full-light state for a predetermined time period.

Then, the lighting in the manner shown in FIGS. 5D to 5F is sequentially repeated a plurality of times. As a result, the sub headlight light sources 13La to 13Lc, 13Ra to 13Rc are caused to flash.

As thus far described, in the motorcycle 10 according to this preferred embodiment, the sub headlight light sources 13La to 13Lc, 13Ra to 13Rc are turned on in accordance with the lean angle. As a result, the field of view can be ensured in an area at the inner side of a curve and ahead in the advancing direction (see FIG. 3). Moreover, at a time of parking or stopping, an answerback function can be achieved, and at a time of running straight ahead, the sub headlight light sources 13La to 13Lc, 13Ra to 13Rc are able to function as a position light (see FIG. 4). Thus, the sub headlight light sources 13La to 13Lc, 13Ra to 13Rc serve a plurality of functions, which can prevent a size increase of the device as a whole.

In the motorcycle 10 according to this preferred embodiment, the sub headlight 13 preferably includes the sub headlight units 13L and 13R, each of which is provided at each side with respect to the width direction of the vehicle. However, the present invention is not limited to this example. For example, in a possible configuration, the sub headlight units 13L and 13R each provided at each side with respect to the width direction of the vehicle are preferably formed to be integral with each other, as a single sub headlight unit. In this case, the single sub headlight unit preferably includes, at each side thereof with respect to the width direction of the vehicle, a plurality of headlight light sources that generate illumination ranges at one side with respect to the width direction of the vehicle.

This preferred embodiment describes a case where each of the sub headlight units 13L and 13R preferably is a physically integrated unit. However, the present invention is not limited to this example. It may be possible that the sub headlight unit 13L is physically divided into the sub headlight light sources 13La to 13Lc. In this case, it may be possible that these sub headlight light sources 13La to 13Lc are assembled into a single sub headlight unit 13L which is then installed in the motorcycle 10 (vehicle). It may be also possible that each of the sub headlight light sources 13La to 13Lc is individually installed in the motorcycle 10. In this case, the sub headlight light sources 13La to 13Lc, in a state of being installed in the motorcycle 10, constitute a single sub headlight unit 13L.

In this preferred embodiment, the sub headlight units 13L and 13R are preferably members separate from the main headlight 11. However, the present invention is not limited to this example. It may be acceptable that a sub headlight unit is integrated with a main headlight. In this case, the sub headlight unit includes the main headlight.

The attitude detection sensor 22 and the vehicle speed sensor 23 correspond to a detection unit arranged to detect variables available to obtain the lean angle of the motorcycle 10. Although the detection unit preferably includes the attitude detection sensor 22 and the vehicle speed sensor 23 in this preferred embodiment, the present invention is not limited to this example. For example, the detection unit may include the attitude detection sensor 22 while not including the vehicle speed sensor 23.

The answerback main unit 21 includes a communication device and a control unit. The communication device corresponds to a communication unit of a preferred embodiment of the present invention. The controller 20 and the control unit correspond to a control unit of a preferred embodiment of the present invention. However, a hardware configuration of the present invention is not limited to this example. For example, the answerback main unit 21 and the controller 20 may be integrated with each other. In a case where the answerback function is not provided, the controller 20 corresponds to the control unit of the present invention. The control unit determines whether or not the lean angle of the motorcycle 10 has reached the reference value based on the variables detected by the detection unit. At this time, it is not always necessary that the control unit calculates the lean angle. No particular limitation is put on details of processing performed in the control unit. For example, it may be possible that the memory provided in the controller 20 serving as the control unit stores, in the form of data, a table in which the angular velocity (roll rate) and the vehicle speed are associated with a result of whether or not the lean angle has reached the first reference value. In this case, the control unit refers to the table based on the angular velocity and the vehicle speed, and can determine whether or not the lean angle has reached the first reference value without calculating the lean angle.

In this preferred embodiment, the lean angle preferably is the angle of inclination of the vehicle body to the inner side of a curve relative to the upright state (vertical direction). However, the present invention is not limited to this example. The lean angle may be the angle of inclination of the vehicle body to the inner side of a curve relative to a direction perpendicular to a road surface. As a method and a device for measuring the angle of inclination of the vehicle body to the inner side of a curve relative to the direction perpendicular to the road surface, conventionally known ones are adoptable.

This preferred embodiment describes a case where the sub headlight units 13L and 13R preferably are members separate from the control unit (the controller 20 and the control unit of the answerback main unit 21), the communication unit (the communication device of the answerback main unit 21), and the detection unit (the attitude detection sensor 22 and the vehicle speed sensor 23). However, the present invention is not limited to this example. The sub headlight unit may include at least one of the control unit, the communication unit, and the detection unit.

In this preferred embodiment, three sub headlight light sources preferably are provided at each side of the vehicle with respect to the width direction of the vehicle. In the present invention, however, no particular limitation is put on the number of sub headlight light sources. The number of sub headlight light sources may be one. It is not always necessary that the sub headlight light source is provided at each side of the vehicle with respect to the width direction of the vehicle.

This preferred embodiment describes a case where the sub headlight light source preferably is turned on in accordance with the lean angle. However, the present invention is not limited to this example. The sub headlight light source may be configured such that a turn-on function in accordance with the lean angle is manually activated or deactivated. To be specific, it may be possible that the function is manually put into a standby state and, in the standby state, the sub headlight light source is turned on in accordance with the lean angle. In this case as well, the sub headlight light source is turned on not manually but in accordance with the lean angle. In the flasher, on the other hand, flashing/turn-off is manually switched. Also, in the main headlight, the illuminating direction is manually switched. In this manner, the sub headlight light source is different from the flasher and the main headlight.

The sub headlight light source may be also configured such that an instruction for turn-on or turn-off is manually inputted. In such a case, when the instruction is not inputted, the brightness of the sub headlight light source is changed in accordance with the lean angle, while when the instruction is inputted, turn-on or turn-off is performed in accordance with the instruction. For example, when the instruction for turn-on is inputted, the sub headlight light source is turned on irrespective of the lean angle. When the instruction for turn-off is inputted, the sub headlight light source is turned off irrespective of the lean angle. In such a case, the sub headlight system includes an input unit (for example, a switch) to which the instruction to turn on or off the sub headlight light source is manually inputted. When the instruction is inputted, the control unit turns on or off the sub headlight light source in accordance with the instruction. When the instruction is not inputted, the control unit changes the brightness of the sub headlight light source in accordance with the lean angle. In this case as well, the sub headlight light source is different from the flasher and the main headlight, in that a function of turning on the sub headlight light source in accordance with the lean angle is provided.

The sub headlight light source may be configured such that, when the lean angle is equal to or larger than a minimum reference value, the brightness is changed in accordance with the lean angle, while when the lean angle is less than the minimum reference value (for example, at a time of running straight ahead), the brightness is manually changed. In this case as well, the sub headlight light source is different from the flasher and the main headlight, in that a function of turning on the sub headlight light source in accordance with the lean angle is provided.

In the description of this preferred embodiment, the sub headlight light source preferably is, when turned on in accordance with the lean angle, turned on in the full-light state. However, the present invention is not limited to this example. It suffices that the amount of light emitted when the sub headlight light source is turned on in accordance with the lean angle is greater than the amount of light emitted when the sub headlight light source is turned on or caused to flash at a time of parking or stopping or at a time of running straight ahead.

In the description of this preferred embodiment, the sub headlight light source is turned on in accordance with the lean angle. Here, the sub headlight light source is turned on in accordance with the lean angle because the sub headlight light source functions mainly as a light that ensures the field of view of the rider of the vehicle. Therefore, in a well-lit situation, for example, in daytime, the sub headlight light source may not necessarily be turned on in accordance with the lean angle. In this case, the state at a time of parking or stopping or at a time of running straight ahead, in which the sub headlight light source is turned on or caused to flash with the amount of light being smaller than the amount of light emitted when the sub headlight light source is turned on in accordance with the lean angle, may be continued even in a case where the lean angle is detected. In a preferred embodiment of the present invention, the time of running straight ahead includes not only a time of running under a state where the vehicle is in the upright state but also a time of running under a state where the lean angle of the vehicle is less than the minimum reference value.

In the present invention, no particular limitation is put on the lighting pattern of the sub headlight light sources given by the answerback function. It is preferable that the lighting pattern (the order and time of turning on) of sub headlight light sources given by the answerback function is different from the lighting pattern of the sub headlight light sources given in accordance with the lean angle.

In the description of this preferred embodiment, the sub headlight light sources are preferably used for achievement of the answerback function and also used as a position light. Instead, the sub headlight light sources may be used for either one of them. In the present invention, the intended use of the sub headlight light sources is not limited. For example, in a possible configuration, at a time of switching between a state where an immobilizer is set (a state where the vehicle is not able to run with its own power) and a state where the setting of the immobilizer is disabled (a state where the vehicle is able to run with its own power), the sub headlight light sources function as a status display by being turned on or caused to flash for a predetermined time period with the amount of light per unit of time being reduced as compared with the amount of light per unit of time emitted when the vehicle is turned on in accordance with the lean angle. Moreover, in another possible configuration, the sub headlight light sources are used for an alarm and/or a panic alarm of a theft warning device. Furthermore, the sub headlight light sources can be used as a passing light. That is, it may be possible that, when the rider operates a passing switch at a time of running straight ahead, the sub headlight light sources are turned on or caused to flash for a predetermined time period. In this case, a time period of the turn-on or flashing is the predetermined time period (that is, temporary). Thus, a time period in which the turn-on or flashing is continued is short. Therefore, the amount of light per unit of time is small. Here, the predetermined time period may be, for example, a time period that has been set in advance, or a time period from when the passing switch is turned on to when the passing switch is turned off. More specifically, a preferred embodiment of the present invention can adopt the following configuration.

According to another preferred embodiment of the present invention, a sub headlight system for use in a vehicle that leans into turns includes a sub headlight unit according to any one of the above-described preferred embodiments of the present invention; an immobilizer that stops, through an electronic method, a function of a device (such as a motor) that moves the vehicle, to prevent the vehicle from running by itself; an immobilizer control device that sets the immobilizer and disables the setting of the immobilizer; a detection unit that detects a variable (such as a vehicle speed and a roll rate) to obtain a lean angle of the vehicle; and a control unit that controls light emission of a sub headlight light source, wherein the control unit turns on the sub headlight light source in accordance with the lean angle of the vehicle and, when the immobilizer control device sets the immobilizer and disables the setting of the immobilizer at a time of parking, the control unit causes the sub headlight light source to be turned on or flash with the amount of light per unit of time being smaller than the amount of light per unit of time emitted when the sub headlight light source is turned on in accordance with the lean angle of the vehicle.

According to another preferred embodiment of the present invention, a sub headlight system for use in a vehicle that leans into turns includes a sub headlight unit according to any one of the preferred embodiments of the present invention described above; a change detection unit (such as an inclination sensor and a vibration sensor) that detects a change caused by intrusion or interference into the vehicle; a detection unit that detects a variable (such as a vehicle speed and a roll rate) to obtain a lean angle of the vehicle; and a control unit that controls light emission of a sub headlight light source, wherein the control unit turns on the sub headlight light source in accordance with the lean angle of the vehicle and, at a time of parking, in accordance with detection of a change by the change detection unit, the control unit causes the sub headlight light source to be turned on or flash with the amount of light per unit of time being reduced as compared with the amount of light per unit of time emitted when the sub headlight light source is turned on in accordance with the lean angle of the vehicle.

According to another preferred embodiment of the present invention, a sub headlight system for use in a vehicle that leans into turns includes a sub headlight unit according to any one of the preferred embodiments of the present invention described above; a passing switch configured to be operated by a rider; a detection unit that detects a variable (such as a vehicle speed and a roll rate) to obtain a lean angle of the vehicle; and a control unit that controls light emission of a sub headlight light source, wherein the control unit turns on the sub headlight light source in accordance with the lean angle of the vehicle and, in a case where the passing switch is operated at a time when the vehicle is running straight ahead, the control unit causes the sub headlight light source to be turned on or flash with the amount of light per unit of time being reduced as compared with the amount of light per unit of time emitted when the sub headlight light source is turned on in accordance with the lean angle of the vehicle.

In the conventional techniques, as disclosed in Japanese Patent No. 4806550, when the lean angle increases, the sub headlight light source is turned on, while when the lean angle decreases, the sub headlight light source is turned off. The reason for turning off the sub headlight light source is for the purpose of preventing glare. That is, conventionally, there have been reasonable grounds for turning off the sub headlight light source at a time of parking or stopping and at a time of running straight ahead. The causes of glare are the orientation (illumination range) and brightness of the sub headlight light source.

As for the brightness of the sub headlight light source, the sub headlight light source is a light intended mainly to improve the visibility for the rider and therefore, in normal cases, the brightness of the sub headlight light source is set high. However, in a case of achieving a function other than the function for improving the visibility for the rider, that is, in a case of achieving a function for improving the conspicuity of the vehicle including the sub headlight light source when seen from the surroundings, a reduction in the brightness is allowed. This can solve the problem of glare.

As for the orientation of the sub headlight light source, on the other hand, the fact that a disadvantages of glare has conventionally existed means that the conspicuity of the vehicle including the sub headlight light source when seen from the surroundings is high. Therefore, adjusting the brightness of the sub headlight light source in the above-described manner to thereby solve the problem of glare makes it possible that the disadvantage of glare is turned into the advantage of high conspicuity of the vehicle including the sub headlight light source when seen from the surroundings, which can be thus leveraged. This idea underlies the accomplishment of preferred embodiments of the present invention.

The conventional techniques do not involve the technical idea that a headlight that produces an illumination range including an area above a horizontal plane when the vehicle is in the upright state is turned on with a reduced amount of light per unit of time so that the headlight is used for achievement of the answerback function and also used as a position light providing excellent conspicuity of the vehicle including the sub headlight light source when seen from the surroundings. Moreover, the conventional techniques do not involve the technical idea that a headlight that produces an illumination range including an area above the horizontal plane when the vehicle is in the upright state is turned on while the vehicle is in the upright state. Therefore, preferred embodiments of the present invention are based on the technical ideas different from those of the conventional techniques, and achieve advantageous effects that cannot be obtained from the conventional techniques.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sub headlight system for use in a vehicle that leans into turns, the sub headlight system comprising:
   a sub headlight unit including a sub headlight light source that illuminates an area ahead and outward of the vehicle with respect to a width direction of the vehicle;
   a control unit arranged and programmed to control light emission of the sub headlight light source; and
   a detection unit that detects a variable used to obtain a lean angle of the vehicle; wherein
   the sub headlight light source is configured to, when the vehicle is in an upright state, produce an illumination range including an area above a horizontal plane extending horizontally from the sub headlight light source;
   the control unit is arranged and programmed to calculate the lean angle of the vehicle while the vehicle is running and to turn on the sub headlight light source in accordance with the calculated lean angle of the vehicle to emit an amount of light per unit of time; and
   the control unit is arranged and programmed to, at a time of parking or stopping or at a time of running in the upright state, cause the sub headlight light source to be turned on or to flash to emit an amount of light per unit of time that is reduced compared to the amount of light per unit of time emitted when the sub headlight light source is turned on in accordance with the lean angle of the vehicle while the vehicle is running.

2. The sub headlight system according to claim 1, wherein an illumination range of the sub headlight light source produced when the sub headlight light source is turned on or caused to flash with the amount of light per unit of time being reduced is located higher than an illumination range of the sub headlight light source produced when the sub headlight light source is turned on in accordance with the lean angle of the vehicle.

3. The sub headlight system according to claim 1, wherein an optical axis of the sub headlight light source occurring when the sub headlight light source is turned on or caused to flash with the amount of light per unit of time being reduced is directed upward relative to an optical axis of the sub headlight light source occurring when the sub headlight light source is turned on in accordance with the lean angle of the vehicle.

4. The sub headlight system according to claim 1, wherein the sub headlight light source is turned on or caused to flash with the amount of light per unit of time being reduced, under a state where an optical axis of the sub headlight light source is directed at or above the horizontal plane.

5. The sub headlight system according to claim 1, wherein when the sub headlight light source is turned on in accordance with the lean angle of the vehicle, a cut-off line of the sub headlight light source is located at or below the horizontal plane including the sub headlight light source, while when the sub headlight light source is turned on or caused to flash with the amount of light per unit of time being reduced, the cut-off line of the sub headlight light source is wholly or partially located in an area above the horizontal plane including the sub headlight light source.

6. The sub headlight system according to claim 1, further comprising a communication unit that communicates with a portable communication device that is portable for a rider, wherein the control unit turns on the sub headlight light source in accordance with the lean angle of the vehicle and, in a case where communication between the communication unit and the portable communication device satisfies a predetermined condition at a time of parking or stopping, the control unit causes the sub headlight light source to be turned on or flash with the amount of light per unit of time being reduced as compared with the amount of light per unit of time emitted when the sub headlight light source is turned on in accordance with the lean angle of the vehicle.

7. The sub headlight system according to claim 1, wherein the control unit turns on the sub headlight light source in accordance with the lean angle of the vehicle and, at a time of running in the upright state, the control unit turns on the sub headlight light source with the amount of light per unit of time being reduced.

8. A vehicle that leans into turns comprising:
the sub headlight system according to claim 1.

* * * * *